March 13, 1962     P. C. SANDRETTO     3,025,518
LORAN RECEIVER
Filed Nov. 30, 1956
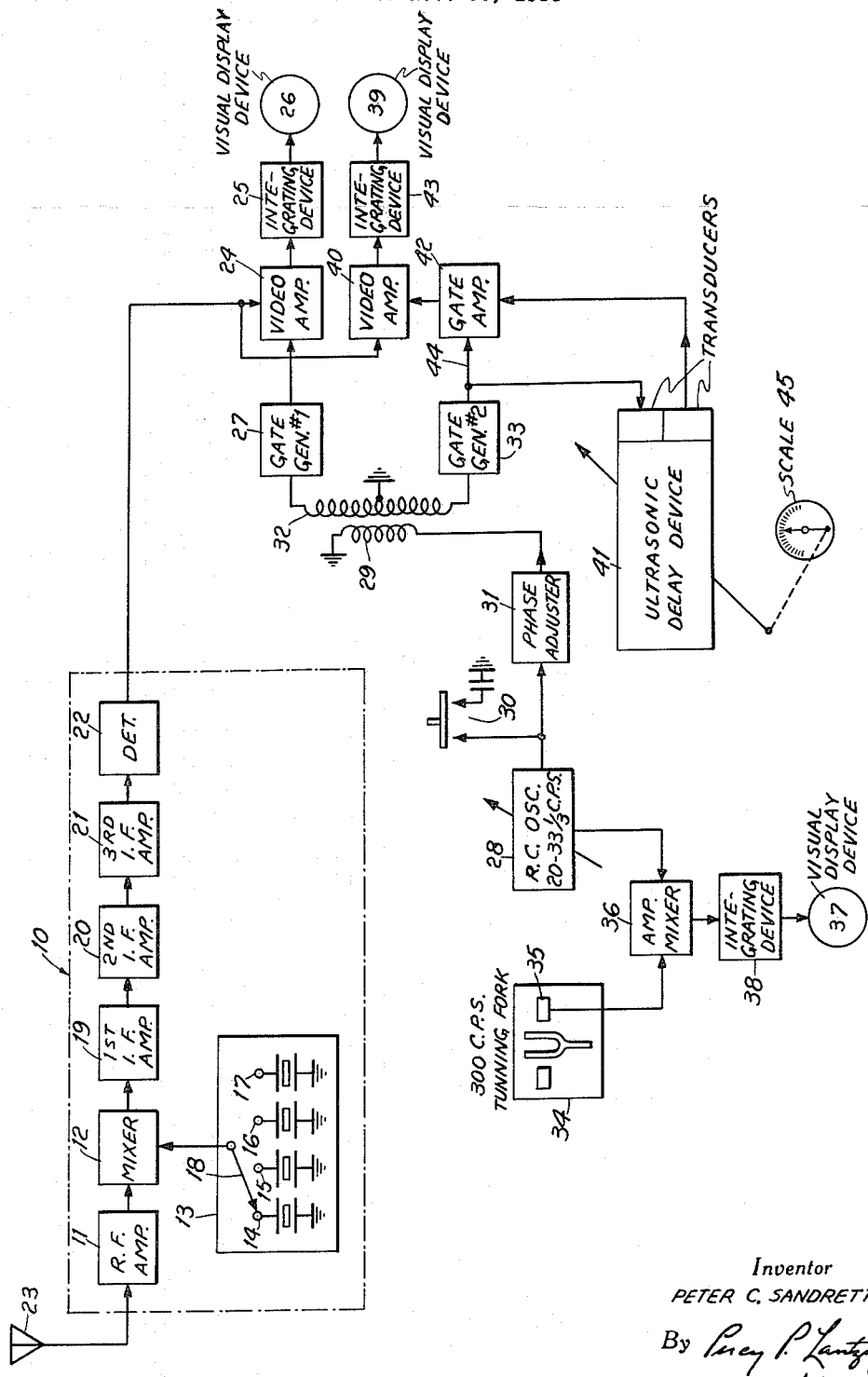
Inventor
PETER C. SANDRETTO
By Percy P. Lantzy
Attorney

United States Patent Office 3,025,518
Patented Mar. 13, 1962

3,025,518
LORAN RECEIVER
Peter C. Sandretto, East Orange, N.J., assignor to International Telephone and Telegraph Corporation, Nutley, N.J., a corporation of Maryland
Filed Nov. 30, 1956, Ser. No. 625,507
8 Claims. (Cl. 343—103)

This invention relates to radio receiving systems and more particularly it relates to receivers for use in positional orientation systems.

A principal object of the invention is to provide a simplified receiver which is especially designed for navigational control systems of the loran kind.

Another object is to provide a simplified loran receiver which employs relatively simple optical display devices to determine the time differential between the master and slave pulses of the loran transmissions.

A further object is to provide a receiver for loran navigational systems and the like wherein the circuitry and number of components are greatly reduced as compared with the standard loran receiver-indicator, whereby the field of usefulness of such equipment can be greatly extended to users who otherwise could not afford the expense and complexity of the conventional loran receiver-indicator.

A feature of the invention relates to a loran receiver which employs a relatively inexpensive oscillator in combination with gate generator devices for generating the recurrent rate timing pulses, and logical circuitry coupled to relatively simple visual display indicators to enable the navigator to translate the loran pulses into positional identifications.

A still further feature relates to the novel combination, arrangement and relative interconnection of components which by their conjoint action enable a simplified and relatively inexpensive receiver-indicator to be manufactured for use in navigational control systems such, for example, as the loran kind.

In certain kinds of navigational control systems, of which the well known loran system is typical, location of a craft is determined by the time interval measured between sets of pulses received on the craft from two or more loran transmitters. For example, the loran system functions by the repetitive transmission from geographically separate radio transmitters, of two pulses at a known time differential. The two transmitters are known, respectively, as the master station and the slave station. The recurrent pairs of pulses are received on a special radio receiver located on the craft and wherein the time differential between the pulses is visually displayed on a cathode ray tube oscilloscope. By means of a previously prepared set of loran charts, accompanying the radio receiver, the navigator is able to determine his geographical location. In the standard loran system in order to obtain a positional fix, the navigator must also measure the time differential between the pulses transmitted by a second pair of loran transmitters so that the line represented by the first set of pulses and the line representing the second set of pulses have an intersection which provides the necessary fix.

The standard loran receiver-indicator includes a conventional superheterodyne radio receiver unit usually designed with four rather wide band fixed frequency channels. The indicator unit comprises a cathode ray tube oscilloscope having the usual horizontal and vertical beam deflection systems. The horizontal deflections of the beam are controlled by a highly precise timing system which requires a precision crystal controlled oscillator and relatively complex timing and frequency dividing circuits between the oscillator and the horizontal deflection elements of the oscilloscope. The vertical deflections of the beam are produced by the differential time pulses received from the loran transmitter. Here again comparatively complex and expensive deflection circuits are required for the vertical deflections.

Furthermore, in the loran system, in order to avoid ambiguity of readings it is necessary to design the chains of adjacent pairs of loran transmitters so that while they radiate at the same channel frequency, nevertheless the transmitters transmit their loran pulses at different recurrent rates. For example, one basic rate, the so-called L rate, may be 25 cycles per second and the other basic rate, the so-called H rate, may be 33⅓ cycles per second. Consequently the loran radio receiver must be capable of adjusting its timing oscillator to either of the two recurrent rates and also must be tunable so as to produce any one of a series of specific rates related to said basic rates, such for example as 25¹⁄₁₆, 25⅛, 25²⁄₁₆, 33⅓, 33⁴⁄₉₀, 33⁵⁄₉₆, 33⅔. It is clear, therefore, that in order to obtain the desired precision of timing for the particular selected recurrent rate a relatively complex and expensive timing oscillator has heretofore been required.

For the above reasons the cost of manufacturing loran receiver-indicators has been such as to restrict their field of application. The present invention enables such field of application to be greatly extended by providing a much simpler and less costly apparatus which nevertheless can be used to receive standard loran transmissions for navigational control purposes.

Referring to the drawing, the dotted portion 10 represents in schematic form any well known radio receiver unit such as is used in a standard loran receiver. For a detailed description of such a receiver reference may be had to "Loran" published by McGraw-Hill Book Company, Inc., 1948, chapter 11. In general the receiver comprises a radio frequency amplifier stage 11 broadly tuned to cover the loran band of 1700 to 2000 kilocycles per second. The radio frequency amplifier is connected to a mixer stage 12 which is also supplied with local heterodyning oscillations from a suitable local oscillator 13. Oscillator 133 may be of the crystal controlled kind having, for example, four piezo crystals 14–17 which can be selectively connected into circuit by a suitable four-position switch 18 to select any one of the conventional loran channels 1750 kilocycles, 1850 kilocycles, 1900 kilocycles, or 1950 kilocycles. The intermediate frequency signal at the output of mixer 12, for example of 1050 kilocycles, is amplified in three successive intermediate frequency amplifier stages 19–21. The output of stage 21 is detected in a suitable detector 22 to detect the loran time differential pulses picked up by the antenna 23, each of these pulses having a duration of approximately 40 microseconds.

The detected signals are then applied to any well-known video amplifier 24, which preferably has a pass band in the order of 1 mc. A description of such video amplifier operation can be found in the text "Electronic and Radio Engineering," fourth edition, by F. Terman, published by McGraw-Hill, 1955. If the amplifier 24 is properly conditioned, its output will be passed through the integrating device 25 to the visual display device 26. In order to condition the video amplifier properly, there must be coincidence between a recurrent rate pulse from the gate generator 27 and a detected pulse from 22. The primary source of the pulses for the gate generator 27 is the variable oscillator 28, which is of the low frequency resistance-capacity type. For a detailed description of a typical oscillator of this kind, reference may be had to "Radio Engineers' Handbook" by Terman, published by McGraw-Hill, 1943, first edition, pages 504–505. The oscillator 28 is designed so as to be tunable over a range of 25 to 33⅓ cycles per second. It is connected to the primary winding 29 of the transformer through a suitable "slipper" device 30 and a suitable phase adjusting device 31. The "slipper" device as can be seen from the drawing is a shorting device which changes the parameters or the tuning circuit and thus changes the frequency of the output. The term "slipper" is indicative of a small change which is preferable in accordance with the invention. The secondary winding 32 of the transformer has its midpoint grounded, one end of the secondary being connected to the gate generator 27 and the opposite end being connected to a similar gate generator 33 whose function will be described hereinbelow. The gate generators used in accordance with the invention can be a standard square wave generator of the type described by Terman in the Radio Engineers' Handbook, supra. By this arrangement therefore the gate generators 27 and 33 generate gate pulses which are 180 electric degrees apart and which occur at a recurrent rate determined by the oscillator 28. Now returning to the proper conditioning of the video amplifier 24, we find we have a gate pulse passing from the output of 27 at a predetermined loran recurrent rate, say for instance, 33⅓ cycles per second. The navigator, who is using the receiver set, will be attempting to receive from the stations transmitting at the 33⅓ repetition rate and will set the oscillator 28 at 33⅓ c.p.s. There will be received at the receiver the loran signals at the 33⅓ repetition rate as well as the other repetition rates such as 33⅔. It is conceivable and highly probable that the detected pulse and the gate pulse will not be in synchronism when the set is first "turned on." A pulse from the stations transmitting the 33⅔ may have coincidence with a gated pulse from 27 and there would be an output from the video amplifier 24, however, this output from 24 would not cause an indication at 26. The integrating device 25 requires a predetermined pulse output rate from 24 in order to condition the visual display device 26 to its threshold level and hence cause an indication at the visual display device 26. It becomes clear that in order to have an indication at the display device 26 there must be a persistent output from the amplifier 24 and further becomes clear that this persistent output can only result from a synchronization of the gate pulses from 27 and detected pulses from 22. As stated before the detected pulses from 22 and the gate pulses from generator 27 are not likely to be in synchronization when the set is first "turned on," so therefore there must be provided a means whereby the receiver can be brought to this desired synchronization. The slipper device 30 is a simple device for accomplishing the desired synchronization. The slipper device 30 acts as a coarse adjustment means. By changing the frequency of the signal from the oscillator, the pulse repetition rate of the gate pulses from the generator 27 will be changed to approach synchronization with the detected pulses from detector 22 and when such synchronization has been accomplished there will be an indication at 26, since there will be a persistent output from the amplifier 24 in accordance with the discussion above. The phase adjuster 31 merely serves as a fine tuning device as is used in many electronic arrangements.

Preferably, although not necessarily, the oscillator 28 may be checked as to its frequency by any well-known frequency standard. For example, such a standard may comprise a 300 cycle per second tuning fork 34 whose pick-up coil 35 is connected to any well-known amplifier mixer device 36 to which is also applied a selected portion of the output from the oscillator 28. It will be understood, of course, that the manually adjustable knob for setting the frequency of the oscillator 28 can be provided with a suitable calibrated scale so that its frequency can be compared with the standard 34. For example, the oscillator 28 can be set at a frequency of 30 cycles per second and the 10th harmonic of that frequency can be fed into the amplifier mixer 36. When the oscillator 28 is at the correct check frequency, it is indicated by a continual indication on the indicator 37 which is connected to the output of the amplifier mixer 36 through the integrating device 38. According to the loran system, as described in volume 4 of M.I.T. "Radiation Laboratory Series" published by McGraw-Hill, 1948, the slave station signal transmission is time delayed from the master station transmission signal such that the slave station signal is transmitted in the second half of a recurrent rate period. As in the standard loran receiver the master station, according to the invention, is read first in order to insure being able to read the time differential between the master station signal reception and the slave station reception. In order to recognize the slave station signal at the visual display device 39, the video amplifier 40 must be conditioned during the slave station signal pulse time as was the video amplifier 24 at the master station signal time. The gate generator 33 passes a pulse at 180 electric degrees out of phase with the pulse passed from gate generator 27. It is clear that if the pulse from gate generator 33 is passed through a variable delay line which is adapted to be varied over one half of the recurrent rate period, then the second half of the recurrent rate period can be examined to find coincidence with a slave station detected pulse from detector 22. In accordance with the invention the pulse is passed through an adjustable ultrasonic delay line 41. This delay line can be of the variety described in the M.I.T. "Radiation Laboratory Series," volume 17, published by McGraw-Hill, 1949. After being delayed by the delay device 41, the pulse from gate generator 33 is passed through a gate amplifier 42, wherein the signal loss which is attributed to the delay line is compensated for. The pulse is then passed from the gate amplifier 42 to the video amplifier 40. Coincidence is accomplished between the detected slave station pulses and the gate pulses by varying the delay line. The delay device, as stated above, is adapted to be varied over the entire interval of time representing the second half of the recurrent rate period. Having previously established a first indication at 26, consideration must be given as to whether or not this indication represented the signal from the master station or the slave station. If the indication was truly from the master station then there will be a second indication at the visual display device 39 at some point as the variable ultrasonic delay line is being varied over its range. If the delay line is varied completely over the range and no indication occurs at 39 then it is obvious that the first indication was that of the slave station and therefore the "slipper" device 30 is operated until a new indication at the visual display device 26 occurs. The integration device 43 serves the same purposes as the integration device 25 which was described above. Line 44 is tied to the gate amplifier 42 to blank this gate amplifier during the period that the video amplifier 24 is conditioned for coincidence to insure that the detected pulse of the master station which attempts to also condition video amplifier 40 will not be erroneously indicated at 39. When the receiver has indications at 26 and 39, the scale 45 which is attached to the variable arm of the variable ultrasonic delay line 41 directly gives the measurement of the time differential between the master station signal reception and the slave station signal reception which can be used to obtain a "fix" for the craft.

I claim:

1. Apparatus for navigational aid systems of the kind wherein positional information is conveyed by sets of signal pulses, the reception time differential between pulses of a set representing a locus in which an object is positioned, comprising: radio receiver means to receive and detect said signal pulses, adjustable reference pulse generating means to generate pulses at a preselected repetition rate, first and second comparison means each coupled to said radio receiver means and said generating means, said first comparison means including a first indicator adapted to be actuated upon coincidence of the generated pulses and a given pulse of each of said sets of signal pulses, said second comparison means including a second indicator adapted to be actuated upon coincidence of said generated pulses and another pulse of each of said sets of signal pulses, said last-mentioned means including an adjustable signal delay device for delaying the pulses applied to said second comparison device by one of said means coupled thereto, thereby producing coincidence in said second comparison device between said generated pulses and said other pulse of each of said sets, whereby said second indicator is actuated.

2. Apparatus for navigational aid systems of the kind wherein positional information is conveyed by sets of signal pulses, the reception time differential between pulses of a set representing a locus in which an object is positioned, and wherein there is a minimal time differential between the reception of a first pulse of said set and a second pulse of said set and this minimal time is greater than the maximum time between said second pulse and said first pulse of the following set, comprising a radio receiver to receive and detect such signal pulses, adjustable reference pulse generating means to generate pulses at a preselected repetition rate, first and second comparison means each coupled to the output of said radio receiver and said generating means, said first comparison means including a first indicator adapted to be actuated when a predetermined time relationship exists between the generated pulses and a pulse of each of said sets of signal pulses, said second comparison means including a second indicator adapted to be actuated when a predetermined time relationship exists between the generated pulses and another pulse in said set of signal pulses, said last-mentioned means including means for delaying the generated pulses applied to said second comparison means with respect to the generated pulses applied to the first comparison means over a range of time whose minimum is equal to the minimal spacing between said first and said second pulses of each set, said delay means being adapted to be varied to produce said predetermined time relationship between said delayed generated pulse and one of said signal pulses, whereby upon actuation of both said indicator devices the delay produced by said delay means is a measure of distance.

3. Apparatus according to claim 1, in which said adjustable reference pulse generating means includes an oscillator having means to vary the phase and frequency of its output.

4. Apparatus for navigational aid systems of the kind wherein positional information is conveyed by sets of signal pulses, the reception time differential between pulses of a set representing a locus in which an object is positioned, comprising a radio receiver to receive and detect said pulses, a low-frequency oscillator for generating oscillations in a low-frequency band, signal conversion means coupled to said oscillator to produce a set of reference pulses which appear ½ cycle out of phase with each other, first and second display devices coupled to said signal conversion means, means to change the phase and frequency of said oscillator output to cause the first display device to produce a distinctive display when there is substantial coincidence between a pulse of each of said sets of signal pulses and said reference pulses, an adjustable signal delay line adapted for delaying a reference pulse for an interval of time representing ½ of the selected oscillator frequency period, means coupling said adjustable signal delay line between said conversion means and said second display device to variably delay a reference pulse for said ½ frequency period to cause said second display unit to produce a distinctive display when there is substantial coincidence between said reference pulses and said signal pulses.

5. Apparatus according to claim 4, in which said conversion means comprises a first and second gate generator and further including a first amplifier connected between said first gate generator and said first display device and a second amplifier connected between said second gate generator and said second display device, both of said amplifiers being conditioned by said reference pulses but in opposite phase.

6. Apparatus according to claim 5, in which each of said amplifiers comprises a video amplifier, and further including first and second integration devices, means to apply detected signal pulses to inputs of both said amplifiers, means to apply the respective outputs of said gate generators to the respective video amplifiers, and means connecting said signal delay line between one of said gate generators and its respective video amplifier whereby one video amplifier is conditioned for an output only when one of the received signal pulses is in substantial coincidence with the oscillations from said oscillator and the other video amplifier is conditioned for an output only when the second of said set of detected signal pulses is in substantial coincidence with the delayed reference pulse from said delay line.

7. Apparatus according to claim 6, further including a calibrated indicator coupled to said adjustable delay line for producing an indication of the said time differential between said signal pulses when both of said display devices are producing their characteristic displays.

8. A receiver-indicator for loran navigational control systems, comprising a loran radio receiver unit for producing at its output respective master and slave pulses whose time differential represents positional information, first and second visual display devices, a low frequency rate generator for generating a frequency signal corresponding to the characteristic recurrence rate of the loran transmitter from which said pulses are received, means to convert said frequency signal into first and second reference pulses, means to obtain from the synchronization of said master pulses and said first reference pulses a first persistent output, means to apply said persistent output to said first display device to cause the first display device to indicate when said first reference pulses are in substantial coincidence with the received master pulses, and means including a time delay line to obtain from the synchronization of said slave pulses and said second reference pulses a second persistent output and means to apply said second persistent output to the second indicator device to cause said second display device to indicate when said second reference pulses are in substantial coincidence with the received slave pulses.

References Cited in the file of this patent

UNITED STATES PATENTS 2,811,717    Palmer _____ Oct. 29, 1957

FOREIGN PATENTS 615,506    Great Britain _____ Jan. 6, 1949